(12) United States Patent
Ross et al.

(10) Patent No.: US 9,969,326 B2
(45) Date of Patent: May 15, 2018

(54) INTENTION SIGNALING FOR AN AUTONOMOUS VEHICLE

(71) Applicant: Uber Technologies, Inc., San Francisco, CA (US)

(72) Inventors: William Payne Ross, Saranac Lake, NY (US); Chenggang Liu, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days. days.

(21) Appl. No.: 15/050,237

(22) Filed: Feb. 22, 2016

(65) Prior Publication Data
US 2017/0240096 A1    Aug. 24, 2017

(51) Int. Cl.
| | | |
|---|---|---|
| *B60Q 1/22* | (2006.01) | |
| *B60Q 1/50* | (2006.01) | |
| *B60Q 5/00* | (2006.01) | |
| *G05D 1/02* | (2006.01) | |
| *G08G 1/005* | (2006.01) | |

(52) U.S. Cl.
CPC .............. *B60Q 1/50* (2013.01); *B60Q 5/005* (2013.01); *G05D 1/0212* (2013.01); *B60Q 2400/50* (2013.01); *G05D 2201/0212* (2013.01); *G08G 1/005* (2013.01)

(58) Field of Classification Search
CPC ........................... G08G 1/167; B60T 8/17558
USPC ........................................................ 340/463
See application file for complete search history.

(56) References Cited

U.S. PATENT DOCUMENTS

| | | | |
|---|---|---|---|
| 6,339,745 B1 | 1/2002 | Novik | |
| 6,424,638 B1 | 7/2002 | Ray | |
| 7,095,318 B1 | 8/2006 | Bekhor | |
| 7,889,065 B2 * | 2/2011 | Smith | ........... B60Q 1/34 |
| | | | 340/475 |
| 7,904,092 B2 | 3/2011 | Hart | |
| 8,155,081 B1 | 4/2012 | Mater | |
| 8,417,239 B1 | 4/2013 | DeCusatis | |
| 8,437,890 B2 | 5/2013 | Anderson | |
| 8,452,310 B1 | 5/2013 | Orlik | |
| 8,676,431 B1 * | 3/2014 | Mariet | ........... B60T 7/22 |
| | | | 701/28 |
| 8,818,719 B1 | 8/2014 | Thanayankizil | |
| 8,880,273 B1 * | 11/2014 | Chatham | ........ G06K 9/00798 |
| | | | 701/23 |
| 8,954,252 B1 * | 2/2015 | Urmson | ............. G08G 1/166 |
| | | | 340/436 |

(Continued)

FOREIGN PATENT DOCUMENTS

| | | |
|---|---|---|
| DE | 10118188 | 10/2002 |
| EP | 2709207 | 3/2014 |

OTHER PUBLICATIONS

ISR and WO issued in PCT/US2016/0068563 dated Apr. 17, 2016.
(Continued)

*Primary Examiner* — Eric M Blount
(74) *Attorney, Agent, or Firm* — Mahamedi IP Law LLP

(57) ABSTRACT

An intention signaling system for an autonomous vehicle (AV) can monitor sensor information indicating a situational environment of the AV, and detect an external entity based, at least in part, on the sensor data. The intention signaling system can generate an output to signal one of an intent of the AV or an acquiescence of the AV to the external entity.

14 Claims, 8 Drawing Sheets

(56) References Cited

U.S. PATENT DOCUMENTS

| | | |
|---|---|---|
| 9,014,905 B1 | 4/2015 | Whitehill |
| 9,025,463 B1 | 5/2015 | Mankee |
| 9,057,620 B2 | 6/2015 | Dave |
| 9,087,348 B2 | 7/2015 | Petrucci |
| 9,107,132 B2 | 8/2015 | Kowshik |
| 9,432,929 B1 | 8/2016 | Ross |
| 9,441,975 B2 | 9/2016 | Pylappan |
| 9,467,832 B2 | 10/2016 | Haney |
| 9,475,422 B2 * | 10/2016 | Hillis ................ B60Q 1/26 |
| 9,481,367 B1 * | 11/2016 | Gordon ............. B60W 30/09 |
| 9,483,948 B1 * | 11/2016 | Gordon ............. G08G 1/166 |
| 9,488,490 B2 * | 11/2016 | Chintakindi |
| 9,537,561 B1 | 1/2017 | Kotecha |
| 9,557,183 B1 | 1/2017 | Ross |
| 9,565,625 B1 | 2/2017 | MacNeille |
| 9,603,158 B1 | 3/2017 | Ross |
| 2002/0029108 A1 | 3/2002 | Liu |
| 2003/0073442 A1 | 4/2003 | Fattouch |
| 2005/0090226 A1 | 4/2005 | Wolf |
| 2005/0168353 A1 | 8/2005 | Dement |
| 2005/0171654 A1 | 8/2005 | Nichols |
| 2006/0059024 A1 | 3/2006 | Bailey |
| 2006/0189353 A1 | 8/2006 | Fujishima |
| 2006/0189533 A1 | 8/2006 | Fujishima |
| 2006/0229070 A1 | 10/2006 | de La Chappelle |
| 2006/0229103 A1 | 10/2006 | Monk |
| 2006/0229104 A1 | 10/2006 | de La Chapelle |
| 2007/0077945 A1 | 4/2007 | Sheynblat |
| 2007/0178911 A1 | 8/2007 | Baumeister |
| 2008/0097688 A1 | 4/2008 | Tashev |
| 2008/0186882 A1 | 8/2008 | Scherzer |
| 2008/0242305 A1 | 10/2008 | Kahlert |
| 2009/0005097 A1 | 1/2009 | Shaffer |
| 2009/0109061 A1 | 4/2009 | McNew et al. |
| 2009/0196234 A1 | 8/2009 | Greene |
| 2009/0196258 A1 | 8/2009 | Escobar Sanz |
| 2009/0254254 A1 | 10/2009 | Wang |
| 2010/0082193 A1 | 4/2010 | Chiappetta |
| 2010/0151865 A1 | 6/2010 | Camp, Jr. |
| 2010/0290359 A1 | 11/2010 | Dewey |
| 2011/0128161 A1 | 6/2011 | Bae et al. |
| 2011/0171960 A1 | 7/2011 | Hershey |
| 2011/0227757 A1 | 9/2011 | Chen |
| 2013/0073327 A1 | 3/2013 | Edelberg |
| 2013/0115956 A1 | 5/2013 | Ewert |
| 2013/0122934 A1 | 5/2013 | Branch |
| 2013/0142035 A1 | 6/2013 | Sunderrajan |
| 2013/0182575 A1 | 7/2013 | McLean |
| 2013/0184985 A1 | 7/2013 | Bollars |
| 2013/0218469 A1 | 8/2013 | Turton |
| 2013/0225229 A1 | 8/2013 | Al-Shalash |
| 2013/0279349 A1 | 10/2013 | Pandey |
| 2013/0322388 A1 | 12/2013 | Ahn |
| 2014/0087739 A1 | 3/2014 | Weaver |
| 2014/0180501 A1 | 6/2014 | Kyllmann |
| 2014/0188377 A1 | 7/2014 | Bonawitz |
| 2014/0297116 A1 | 10/2014 | Anderson |
| 2014/0306833 A1 | 10/2014 | Ricci |
| 2014/0309789 A1 | 10/2014 | Ricci |
| 2014/0309814 A1 | 10/2014 | Ricci |
| 2014/0309864 A1 | 10/2014 | Ricci |
| 2014/0355476 A1 | 12/2014 | Anderson |
| 2015/0023256 A1 | 1/2015 | Liu |
| 2015/0063144 A1 | 3/2015 | Kozat |
| 2015/0081212 A1 | 3/2015 | Mitchell |
| 2015/0133167 A1 | 5/2015 | Edge |
| 2015/0149078 A1 | 5/2015 | Profous |
| 2015/0215738 A1 | 7/2015 | Frusina |
| 2015/0222372 A1 | 8/2015 | Le Grand |
| 2015/0264519 A1 | 9/2015 | Mirzaei |
| 2015/0281906 A1 | 10/2015 | Tseng |
| 2015/0308841 A1 | 10/2015 | Matsunaga |
| 2015/0331111 A1 | 11/2015 | Newman |
| 2015/0339928 A1 | 11/2015 | Ramanujam |
| 2016/0006723 A1 | 1/2016 | Wilson |
| 2016/0073117 A1 | 3/2016 | Grasmug |
| 2016/0157254 A1 | 6/2016 | Novlan |
| 2016/0282468 A1 | 9/2016 | Gruver |
| 2016/0301698 A1 | 10/2016 | Katara |
| 2016/0323356 A1 | 11/2016 | Ribeiro |
| 2016/0337935 A1 | 11/2016 | Patil |
| 2017/0120804 A1 | 5/2017 | Kentley |
| 2017/0132334 A1 | 5/2017 | Levinson |
| 2017/0268888 A1 | 9/2017 | Blumenberg |

OTHER PUBLICATIONS

Jennifer J.N.Liu, et al., "Mobile Ad Hoc Networking with a View of 4G Wireless: Imperatives and Challenges", In: Mobie Ad Hoc Networking, 2004 Institute of Electrical and Electronics Engineers, Inc. Jan. 28, 2005, Section 1.2.

ISR and WO issued in PCT/US2016/065656 dated Apr. 11, 2016.

* cited by examiner

US 9,969,326 B2

INTENTION SIGNALING FOR AN AUTONOMOUS VEHICLE

BACKGROUND

Autonomous vehicles (AVs) may require continuous sensor data processing in order to operate through road traffic on public roads in order to match or even surpass human capabilities. In certain situations, AVs must make decisions based on the actions of an external entity, such as a pedestrian or a human driver. When human drivers approach intersections, crosswalks, bicycle lanes, parking lots, crowded areas, etc., reliance is commonly made on intentional or permissive signaling where humans typically provide expressions such as hand signals (e.g., hand waving) to other humans indicating acquiescence and/or intent.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
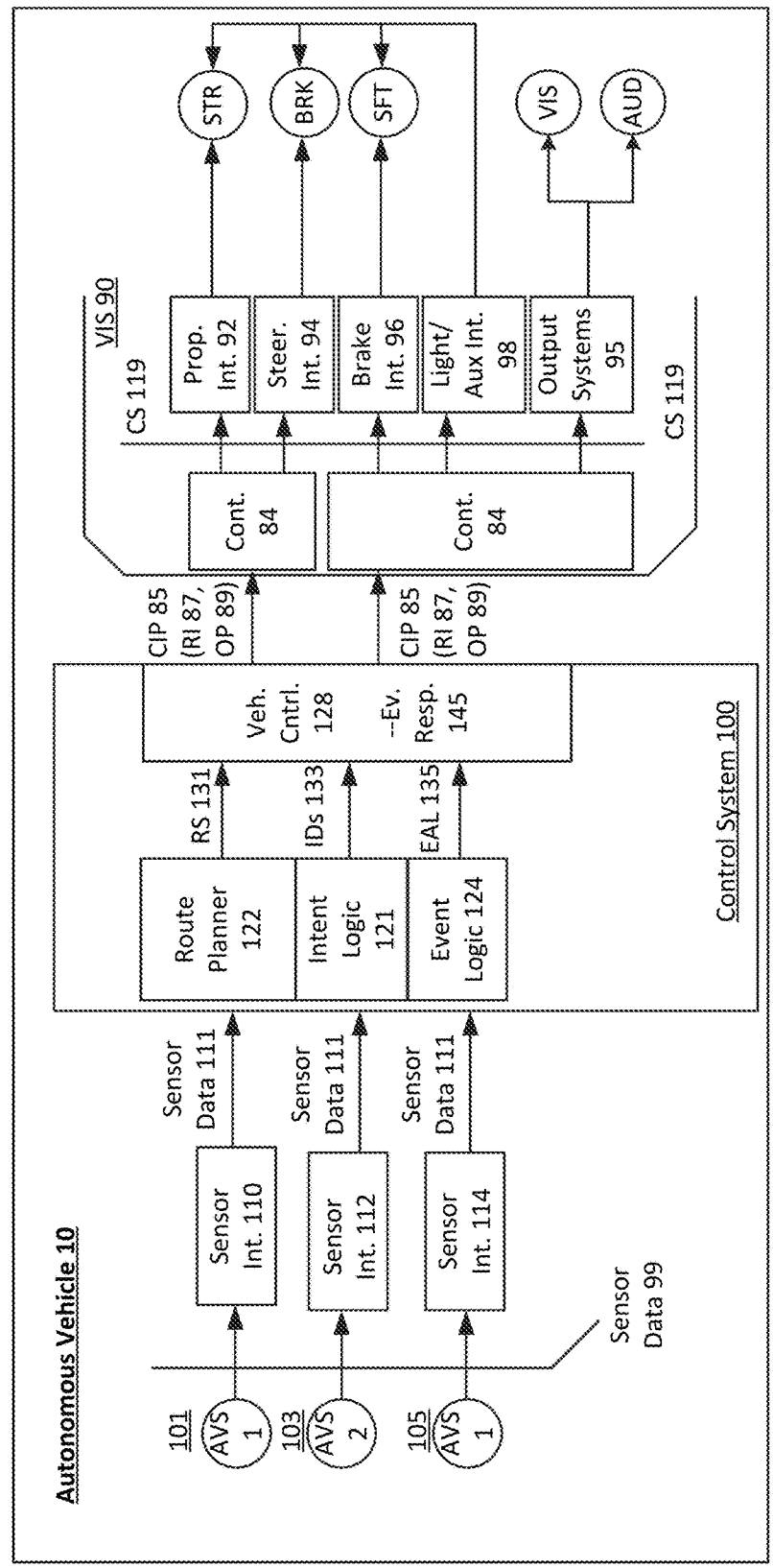
FIG. 1 is a block diagram illustrating an example control system for operating an autonomous vehicle including, as described herein.

An intention signaling system is disclosed that enables an autonomous vehicle (AV) to signal intent and/or permissiveness to proximate humans. The intention signaling system can include an output system having a number of visual and/or audio devices (e.g., a display and speaker arrangement) to enable the intention signaling system to provide feedback to humans in certain situations. For example, when the AV arrives at a four-way stop sign just prior to a human-driven vehicle, the intention signaling system can generate an intention output based on sensor data from an on-board sensor array or computing system of the AV. The intention signaling system can provide the intention output to the human driver of the proximate vehicle indicating that the AV will proceed through the intersection first. In many examples, the intention signaling system can display the intention output on a number of displays visible to the human driver. Such displays can be situated within the AV (e.g., a head-up display) or integrated with or otherwise mounted to the exterior surfaces of the AV (e.g., as a bumper displays along the front and/or rear bumper of the AV or on the side panels of the AV). Additionally or alternatively, the intention output can include an audible output providing the intention information of the AV to the external entities.

In certain implementations, the intention signaling system can receive sensor data from the AV's on-board computing system. The sensor data can indicate a number of proximate humans (e.g., pedestrians, bicyclists, human drivers, etc.) whose paths may intersect the path of the AV. According to an example, the intention signaling system can generate either an intention output indicating the AV's intent (e.g., to proceed ahead of the humans) or a permissive output indicating that the AV is giving the humans right-of-way to cross the AV's path. For example, the intention signaling system can utilize right-of-way information (e.g., a traffic signal or crosswalk indicator) to determine whether the AV or the proximate humans have right-of-way. If the proximate humans have right-of-way, the intention signaling system can generate a permissive output (e.g., display green arrows and/or project an image such as a crosswalk onto the pavement) that enables the humans to readily determine the AV's acquiescence. If the AV has right-of-way, the intention signaling system can generate an intention output indicating that the AV will proceed before the humans. This permissive output can also include visual and/or audible feedback (e.g., flashing red lights or a pedestrian halt symbol on a display).

In some examples, the intention signaling system can prioritize or otherwise enable visual displays (e.g., LCD screens or head-up displays), audio devices, projection devices, or mechanical indicators (e.g., a mechanical hand) to provide the intention output to the external entities. In some aspects, the intention signaling system can prioritize an output device based on the state of the AV. For example, if the AV is at rest, the intention signaling system can enable an audio device to provide audible feedback to pedestrians. Additionally or alternatively, the intention signaling system can enable an output device based on ambient conditions. For example, the intention signaling system can utilize a projection output (e.g., projecting a crosswalk for pedestrians) during nighttime conditions.

According to examples described herein, the intention signaling system can also express urgency in a generated permissive output. For example, the intention signaling system can flash colored lights or symbols on the displays, and progressively increase the brightness or blink frequency, provide a visual countdown, and/or scroll across the display more rapidly. Additionally or alternatively, the AV can change an urgency parameter of the audio output (e.g., volume) or provide an audible countdown. In variations, the intention signaling system can utilize various other AV subsystems, such as the exterior lights, the accelerator and braking systems, and/or the steering system to further express the intention output. As an example, the intention signaling system can utilize the accelerator and brake to nudge the AV forward to indicate that the AV wishes to proceed. In variations, the intention signaling system can further utilize the exterior lights, such as the head lamps and high beam lights, the taillights and brake lights, and the directional lights to further indicate intent and/or urgency.

Among other benefits, the examples described herein achieve a technical effect of providing autonomous vehicles with the capability of signaling intent to humans to prevent confusion and optimize traffic flow. Still further, by signaling intent, an autonomous vehicle can reduce the number of potential accidents that may occur, leading to a safer roads.

As used herein, a computing device refers to devices corresponding to desktop computers, cellular devices or smartphones, personal digital assistants (PDAs), laptop computers, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of an autonomous vehicle (AV). An AV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs drive without any human assistance from within or external to the vehicle. Such vehicles often are required to make advance determinations regarding how the vehicle is behave given challenging surroundings of the vehicle environment.

System Description

FIG. 1 shows a block diagram illustrating an AV in accordance with example implementations. In an example of FIG. 1, a control system 100 can be used to autonomously operate an AV 10 in a given geographic region for a variety of purposes, including transport services (e.g., transport of humans, delivery services, etc.). In examples described, an autonomously driven vehicle can operate without human control. For example, in the context of automobiles, an autonomously driven vehicle can steer, accelerate, shift, brake and operate lighting components. Some variations also recognize that an autonomous-capable vehicle can be operated either autonomously or manually.

In one implementation, the control system 100 can utilize specific sensor resources in order to intelligently operate the vehicle 10 in most common driving situations. For example, the control system 100 can operate the vehicle 10 by autonomously steering, accelerating, and braking the vehicle 10 as the vehicle progresses to a destination. The control system 100 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 100 includes a computer or processing system which operates to process sensor data that is obtained on the vehicle with respect to a road segment upon which the vehicle 10 operates. The sensor data can be used to determine actions which are to be performed by the vehicle 10 in order for the vehicle 10 to continue on a route to a destination. In some variations, the control system 100 can include other functionality, such as wireless communication capabilities, to send and/or receive wireless communications with one or more remote sources. In controlling the vehicle 10, the control system 100 can issue instructions and data, shown as commands 85, which programmatically controls various electromechanical interfaces of the vehicle 10. The commands 85 can serve to control operational aspects of the vehicle 10, including propulsion, braking, steering, and auxiliary behavior (e.g., turning lights on).

The AV 10 can be equipped with multiple types of sensors 101, 103, 105, which combine to provide a computerized perception of the space and environment surrounding the vehicle 10. Likewise, the control system 100 can operate within the AV 10 to receive sensor data from the collection of sensors 101, 103, 105, and to control various electromechanical interfaces for operating the vehicle on roadways.

In more detail, the sensors 101, 103, 105 operate to collectively obtain a complete sensor view of the vehicle 10, and further to obtain situational information proximate to the vehicle 10, including any potential hazards in a forward operational direction of the vehicle 10. By way of example, the sensors 101, 103, 105 can include multiple sets of cameras sensors 101 (video camera, stereoscopic pairs of cameras or depth perception cameras, long range cameras), remote detection sensors 103 such as provided by radar or LIDAR, proximity or touch sensors 105, and/or sonar sensors (not shown).

Each of the sensors 101, 103, 105 can communicate with the control system 100 utilizing a corresponding sensor interface 110, 112, 114. Each of the sensor interfaces 110, 112, 114 can include, for example, hardware and/or other logical component which is coupled or otherwise provided with the respective sensor. For example, the sensors 101, 103, 105 can include a video camera and/or stereoscopic camera set which continually generates image data of an environment of the vehicle 10. As an addition or alternative, the sensor interfaces 110, 112, 114 can include a dedicated processing resource, such as provided with a field programmable gate array ("FPGA") which can, for example, receive and/or process raw image data from the camera sensor.

In some examples, the sensor interfaces 110, 112, 114 can include logic, such as provided with hardware and/or programming, to process sensor data 99 from a respective sensor 101, 103, 105. The processed sensor data 99 can be outputted as sensor data 111. As an addition or variation, the control system 100 can also include logic for processing raw or pre-processed sensor data 99.

According to one implementation, the vehicle interface subsystem 90 can include or control multiple interfaces to control mechanisms of the vehicle 10. The vehicle interface subsystem 90 can include a propulsion interface 92 to electrically (or through programming) control a propulsion component (e.g., an accelerator pedal), a steering interface 94 for a steering mechanism, a braking interface 96 for a braking component, and a lighting/auxiliary interface 98 for exterior lights of the vehicle. The vehicle interface subsystem 90 and/or the control system 100 can include one or more controllers 84 which can receive one or more commands 85 from the control system 100. The commands 85 can include route information 87 and one or more operational parameters 89 which specify an operational state of the vehicle 10 (e.g., desired speed and pose, acceleration, etc.).

The controller(s) 84 can generate control signals 119 in response to receiving the commands 85 for one or more of the vehicle interfaces 92, 94, 96, 98. The controllers 84 can use the commands 85 as input to control propulsion, steering, braking, and/or other vehicle behavior while the AV 10 follows a current route. Thus, while the vehicle 10 is actively drive along the current route, the controller(s) 84 can continuously adjust and alter the movement of the vehicle 10 in response to receiving a corresponding set of commands 85 from the control system 100. Absent events or conditions which affect the confidence of the vehicle 10 in safely progressing along the route, the control system 100 can generate additional commands 85 from which the controller(s) 84 can generate various vehicle control signals 119 for the different interfaces of the vehicle interface subsystem 90.

According to examples, the commands 85 can specify actions to be performed by the vehicle 10. The actions can correlate to one or multiple vehicle control mechanisms (e.g., steering mechanism, brakes, etc.). The commands 85 can specify the actions, along with attributes such as magnitude, duration, directionality, or other operational characteristic of the vehicle 10. By way of example, the commands 85 generated from the control system 100 can specify a relative location of a road segment which the AV 10 is to occupy while in motion (e.g., change lanes, move into a center divider or towards shoulder, turn vehicle, etc.). As other examples, the commands 85 can specify a speed, a change in acceleration (or deceleration) from braking or accelerating, a turning action, or a state change of exterior lighting or other components. The controllers 84 can translate the commands 85 into control signals 119 for a corresponding interface of the vehicle interface subsystem 90. The control signals 119 can take the form of electrical signals which correlate to the specified vehicle action by virtue of electrical characteristics that have attributes for magnitude, duration, frequency or pulse, or other electrical characteristics.

In an example of FIG. 1, the control system 100 can include a route planner 122, intent logic 121, event logic 124, and a vehicle control 128. The vehicle control 128 represents logic that converts alerts of event logic 124 ("event alert 135") and intention decisions 133 by the intent logic 121 into commands 85 that specify a set of vehicle actions and/or an intention output.

Additionally, the route planner 122 can select one or more route segments that collectively form a path of travel for the AV 10 when the vehicle 10 is on a current trip (e.g., servicing a pick-up request). In one implementation, the route planner 122 can specify route segments 131 of a planned vehicle path which defines turn by turn directions for the vehicle 10 at any given time during the trip. The route planner 122 may utilize the sensor interface 110 to receive GPS information as sensor data 111. The vehicle control 128 can process route updates from the route planner 122 as commands 85 to progress along a path or route using default driving rules and actions (e.g., moderate steering and speed).

According to examples described herein, the control system 100 can further execute intent logic 121 to provide intention decisions 133 to the vehicle control 128 indicating whether the AV 10 will, for example, yield or proceed with right-of-way. In certain aspects, the intention decisions 133 can relate to whether or not the AV 10 has right-of-way in a given situation with regard to an external entity. The external entity can be a pedestrian or group of pedestrians, a human-driven vehicle, a bicyclist, and the like. The vehicle control 128 generate commands 85 to initiate output systems 95 of the vehicle interface systems 90 based on the intention decisions 133. For example, the AV 10 can approach an intersection and the control system 100, executing the intent logic 121, can identify a green traffic light indicating right-of-way for the AV 10. The intention decision 133 for the intersection can comprise a decision to proceed through the intersection with right-of-way, which the vehicle control 128 can process in conjunction with the event alerts 135 (e.g., identifying proximate vehicles and pedestrians that have potential to intersect with the AV 10). Based on the right-of-way decision 133, the vehicle control 128 can transmit commands 85 to the controller 84 to generate an intention output, using the output systems 95, indicating the AV's 10 intention to proceed through the intersection with rig ht-of-way.

The output systems 95 can include any number of visual or audio components (e.g., displays, mechanical indicators, speakers, projectors, etc.) that the controller 84 can utilize to generate the intention output. For example, to indicate the right-of-way intent of the AV 10, the controller can generate control signals 119 that provide a combined audio and visual alert to proximate pedestrians and human drivers to yield to the AV 10. For example, the controller 84 can cause the output systems 95 to generate a short siren sound and visual indicators (e.g., displayed arrows) providing the proximate humans with a clear indication of the AV's 10 intent to proceed. Thus, as the AV 10 approaches the intersection and determines that it has right-of-way, the output systems 95 can provide the intention output, and the event logic 124 can continue to monitor the proximate pedestrians, vehicles, and other dynamic objects for potential conflicts. As such, the intention output by the output systems 95 can act as a prophylactic measure to prevent potential incidents, instead of the control system 100 solely reacting cautiously to potential hazards and accidents.

In many implementations, the intent logic 121 can monitor the situational environment of the AV 10 continuously in order to make intention decisions 133 dynamically as the AV 10 travels along a current route. In variations, the intention logic 121 can utilize mapping resource data or previously recorded sub-map data to identify intersections, crosswalks, bicycle lanes, parks, school areas, typically crowded areas, parking areas, etc., in order to anticipate an intention decision 133, as described below with respect to FIG. 2. Accordingly, the intent logic 121 can generate intention outputs via the output systems 95 in response to the detection of a conflict with another entity (e.g., a pedestrian or human-driver) and a resolution of which entity has right-of-way. Additionally or alternatively, the intent logic 121 can generate intention outputs via the output systems 95 in any detected area where potential conflict may arise.

In certain implementations, the event logic 124 can trigger a response to a detected event. A detected event can correspond to a roadway condition or obstacle which, when detected, poses a potential hazard or threat of collision to the vehicle 10. By way of example, a detected event can include an object in the road segment, heavy traffic ahead, and/or wetness or other environmental conditions on the road segment. The event logic 124 can use sensor data 111 from cameras, LIDAR, radar, sonar, or various other image or sensor component sets in order to detect the presence of such events as described. For example, the event logic 124 can detect potholes, debris, objects projected to be on a collision trajectory, and the like. Thus, the event logic 124 can detect events which enable the control system 100 to make evasive actions or plan for any potential threats.

When events are detected, the event logic 124 can signal an event alert 135 that classifies the event and indicates the type of avoidance action to be performed. Additionally, the control system 100 can determine whether an event corresponds to a potential incident with a human driven vehicle, a pedestrian, or other human entity external to the AV 10. For potential human incidences, the intent logic 121 can process the sensor data 111 in order to make an intention decision 133, and the control system can generate an intent output using the output systems 95 accordingly. An event can be scored or classified between a range of likely harmless (e.g., small debris in roadway) to very harmful (e.g., vehicle crash may be imminent). In turn, the vehicle control 128 can determine a response based on the score or classification. Such response can correspond to an event avoidance action 145, or an action that the vehicle 10 can perform to maneuver the vehicle 10 based on the detected event and its score or classification. By way of example, the vehicle response can include a slight or sharp vehicle maneuvering for avoidance using a steering control mechanism and/or braking component. The event avoidance action 145 can be signaled through the commands 85 for controllers 84 of the vehicle interface subsystem 90.

In addition, the controller 84 can receive output commands 85 from the vehicle control 128 indicating the intention decision 133 (e.g., indicating a yielding decision, a right-of-way decision, or an emergency decision). The intention decision 133 can be processed by the vehicle control 128 to generate the appropriate output using the output systems 95. For example, sharp vehicle maneuvering can correspond to an emergency intention decision 133. The vehicle control 128 can generate commands 85 to not only perform the avoidance maneuver, but to provide an intention output based on the emergency decision as well. For example, before and/or during the avoidance maneuver, the controller 84 can generate control signals 119 causing the output systems 95 to output flashing red lights, and directional indicators (e.g., flashing red arrows) indicating the direction in which the AV 10 will perform the avoidance maneuver.

When an anticipated dynamic object of a particular class does in fact move into position of likely collision or interference, some examples provide that event logic 124 can signal the event alert 135 to cause the vehicle control 128 to generate commands 85 that correspond to an event avoidance action 145. For example, in the event of a bicycle crash in which the bicycle (or bicyclist) falls into the path of the vehicle 10, event logic 124 can signal the event alert 135 to avoid the collision. The event alert 135 can indicate (i) a classification of the event (e.g., "serious" and/or "immediate"), (ii) information about the event, such as the type of object that generated the event alert 135, and/or information indicating a type of action the vehicle 10 should take (e.g., location of object relative to path of vehicle, size or type of object, etc.). In addition, the intent logic 121 can utilize the event alert 135 to cause the controller 84 to generate a conjunctive output via the output systems 95, such as emergency visuals and an audio output, as described herein.

Figure 2:
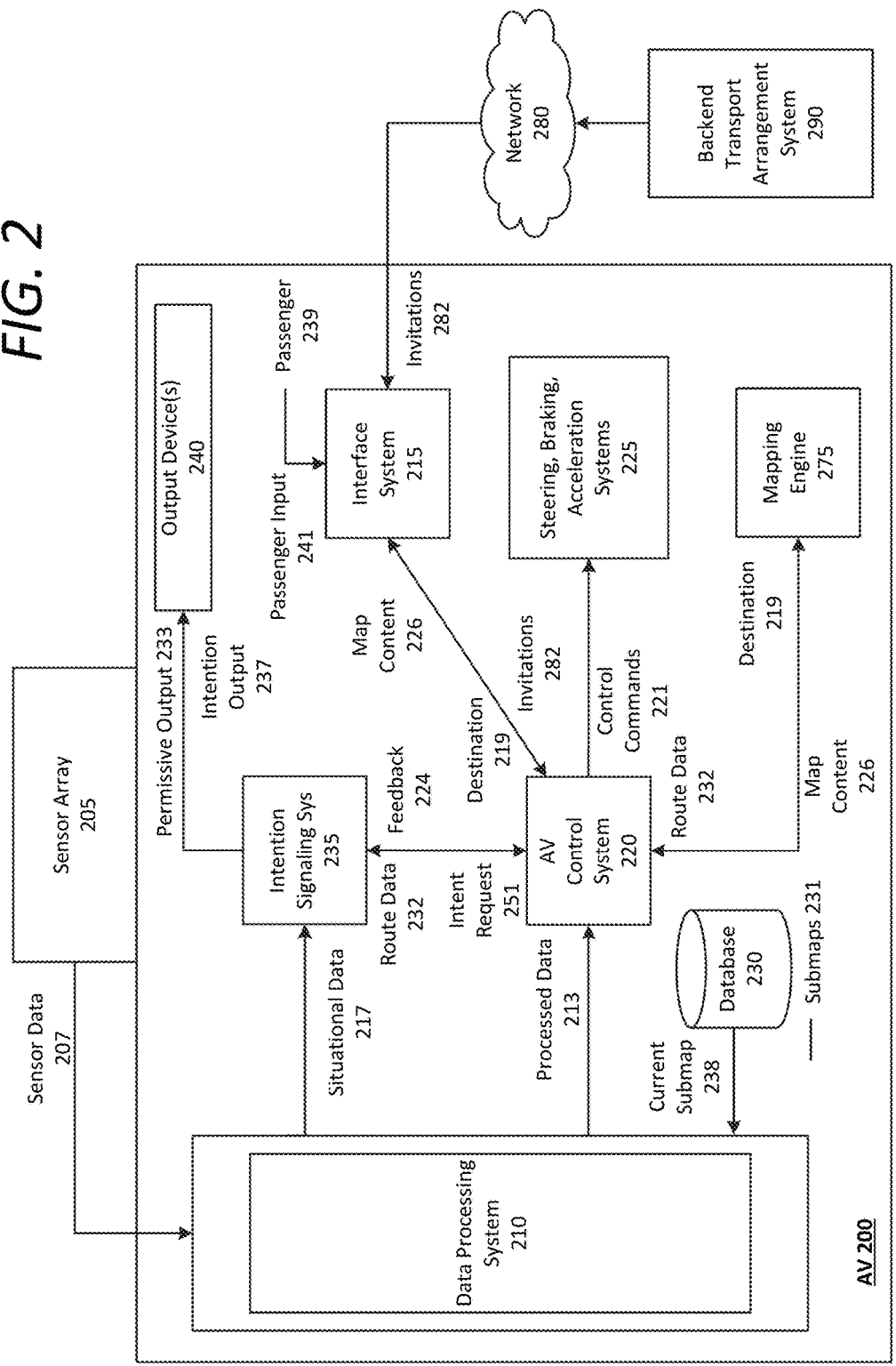
FIG. 2 is a block diagram illustrating an example autonomous vehicle including an intention signaling system, as described herein.

FIG. 2 is a block diagram illustrating an example autonomous vehicle including an intention signaling system, as described herein. The AV 200 shown in FIG. 2 can include some or all aspects and functionality of the autonomous vehicle 10 described with respect to FIG. 1. Referring to FIG. 2, the AV 200 can include a sensor array 205 that can provide sensor data 207 to an on-board data processing system 210. As described herein, the sensor array 205 can include any number of active or passive sensors that continuously detect a situational environment of the AV 200. For example, the sensor array 205 can include a number of camera sensors (e.g., stereo cameras), LIDAR sensor(s), proximity sensors, radar, and the like. The data processing system 210 can utilize the sensor data 207 to detect the situational conditions of the AV 200 as the AV 200 travels along a current route. For example, the data processing system 210 can identify potential obstacles or road hazards—such as pedestrians, bicyclists, objects on the road, road cones, road signs, animals, etc.—in order to enable an AV control system 220 to react accordingly.

In certain implementations, the data processing system 210 can utilize sub-maps 231 stored in a database 230 of the AV 200 (or accessed remotely from the backend system 290 via the network 280) in order to perform localization and pose operations to determine a current location and orientation of the AV 200 in relation to a given region (e.g., a city).

The data sub-maps 231 in the database 230 can comprise previously recorded sensor data, such as stereo camera data, radar maps, and/or point cloud LIDAR maps. The sub-maps 231 can enable the data processing system 210 to compare the sensor data 257 from the sensor array 255 with a current sub-map 238 to identify obstacles and potential road hazards in real time. The data processing system 210 can provide the processed sensor data 213—identifying such obstacles and road hazards—to the AV control system 220, which can react accordingly by operating the steering, braking, and acceleration systems 225 of the AV 200 to perform low level maneuvering.

In many implementations, the AV control system 220 can receive a destination 219 from, for example, an interface system 215 of the AV 200. The interface system 215 can include any number of touch-screens, voice sensors, mapping resources, etc., that enable a passenger 239 to provide a passenger input 241 indicating the destination 219. For example, the passenger 239 can type the destination 219 into a mapping engine 275 of the AV 200, or can speak the destination 219 into the interface system 215. Additionally or alternatively, the interface system 215 can include a wireless communication module that can connect the AV 200 to a network 280 to communicate with a backend transport arrangement system 290 to receive invitations 282 to service a pick-up or drop-off request. Such invitations 282 can include the destination 219 (e.g., a pick-up location), and can be received by the AV 200 as a communication over the network 280 from the backend transport arrangement system 290. In many aspects, the backend transport arrangement system 290 can manage routes and/or facilitate transportation for users using a fleet of autonomous vehicles throughout a given region. The backend transport arrangement system 290 can be operative to facilitate passenger pick-ups and drop-offs to generally service pick-up requests, facilitate delivery such as packages or food, and the like.

Based on the destination 219 (e.g., a pick-up location), the AV control system 220 can utilize the mapping engine 275 to receive route data 232 indicating a route to the destination 219. In variations, the mapping engine 275 can also generate map content 226 dynamically indicating the route traveled to the destination 219. The route data 232 and/or map content 226 can be utilized by the AV control system 220 to maneuver the AV 200 to the destination 219 along the selected route. For example, the AV control system 220 can dynamically generate control commands 221 for the autonomous vehicle's steering, braking, and acceleration system 225 to actively drive the AV 200 to the destination 219 along the selected route. Optionally, the map content 226 showing the current route traveled can be streamed to the interior interface system 215 so that the passenger(s) 239 can view the route and route progress in real time.

In many examples, while the AV control system 220 operates the steering, braking, and acceleration systems 225 along the current route on a high level, the processed data 213 provided to the AV control system 220 can indicate low level occurrences, such as obstacles and potential hazards, to which the AV control system 220 can make decisions and react. For example, the processed data 213 can indicate a pedestrian crossing the road, traffic signals, stop signs, other vehicles, road conditions, traffic conditions, bicycle lanes, crosswalks, pedestrian activity (e.g., a crowded adjacent sidewalk), and the like. The AV control system 220 can respond to the processed data 213 by generating control commands 221 to reactively operate the steering, braking, and acceleration systems 225 accordingly.

According to examples described herein, the AV 200 can include an intention signaling system 235 in connection with a number of output devices 240 to assist the AV control system 220 in efficiently navigating to the destination 219. The output devices 240 can be utilized independently from and/or in conjunction with the AV's 200 normal signaling systems, such as the AV's 200 directional signals and other lighting systems. Furthermore, the output devices 240 can include display devices, such LCD screens or LED arrays, an audio system, a projection system, dash displays or head-up displays, and/or a number of mechanical features (e.g., a mechanical hand mounted to the dashboard of the AV 200). In certain aspects, the output devices 240 can display an animated or virtual driver representing the AV 200. One or more displays showing the animated or virtual driver can be mounted within the passenger interior of the AV 200, such as on the dashboard or incorporated as a head-up display viewable from the front exterior of the AV 200. In variations, the output devices 240 can include any number of exterior displays mounted to or integrated with the bodywork of the AV 200, such as the front bumper or the side panels. Additionally or alternatively, one or more displays or colored LEDs (e.g., a green LED and a red LED) may be incorporated within the headlamp covers of the AV 200 to signal intent (e.g., red indicating to external entities that the AV 200 has right-of-way, and green indicating that the AV 200 is yielding).

In many examples, the intention signaling system 235 can signal intention for the AV 200 by generating an intention output 237 utilizing a combination of the output types, such as a displayed output in combination with an audio output. Additionally, the intention signaling system 235 can generate a permissive output 233 to signal that the AV 200 will yield to an external entity, such as another vehicle at an intersection. The audio output can include any variety of sounds, such as permissive sounds indicating that the AV 200 is yielding, authoritative sounds indicating that the AV 200 is taking right-of-way (e.g., a siren sound), spoken words to provide instructions to external entities, and the like. Furthermore, in certain examples, the intention signaling system 235 can project images onto the roadway, such as a crosswalk to indicate a pedestrian's right-of-way, or forward directional arrows indicating the path that the AV 200 will travel through an intersection.

Additionally or alternatively, the intention signaling system 235 can generate the intention output 237 in conjunction with a intent request 251 to the AV control system 220 to combine the intention output 237 with vehicle "body language" to further evoke the AV's 200 intent. In response to the intent request 251, the AV control system 220 can generate control commands 221 that cause the steering, braking, and acceleration systems 225 to execute functions, such as nudging the AV 200 forward, turning the front wheels, flashing the AV's 200 headlamps, and the like. In some example implementations, such intent requests 251 can be generated by the intention signaling system 235 in situations in which the AV 200 is in a stuck state, such as in an intersection blocking traffic or handling a persistent and crowded crosswalk.

In accordance with aspects disclosed, the intention signaling system 235 can monitor situational data 217 from the data processing system 210 to identify potential areas of conflict. For example, the intention signaling system 235 can monitor forward directional stereoscopic camera data or LIDAR data to identify areas of concern. In one example, the intention signaling system 235 can utilize the current sub-map 238 to identify features along the current route traveled (e.g., as indicated by the route data 232), such as traffic signals, intersections, road signs, crosswalks, bicycle lanes, parking areas, and the like. As the AV 200 approaches such features or areas, the intention signaling system 235 can monitor the forward situational data 217 to identify any external entities that may conflict with the operational flow of the AV 200, such as pedestrians near a crosswalk or another vehicle approaching an intersection.

In many aspects, the intention signaling system 235 can monitor road features that indicate right-of-way. In one example, the intention signaling system 235 monitors a traffic signal for a current lane, as well as potentially conflicting entities, as the AV 200 approaches the signal to dynamically determine whether the AV 200 has right-of-way through the intersection. In some aspects, the intention signaling system 235 can place the output devices 240 on an intention standby mode until a critical threshold is met in which the intention signaling system 235 is certain of the right-of-way for the intersection. For example, when operating at speed, a green traffic signal for the AV 200 can indicate certainty of the AV's 200 right-of-way ~50 feet prior to reaching the intersection. Once the 50 foot threshold is crossed and the traffic signal remains green, the intention signaling system 235 can generate an intention output 237 indicating the AV's 200 right-of-way through the intersection. Accordingly, the output devices 240 can present the intention output 237 to the external entities (e.g., human drivers stopped at the intersection or waiting to turn into the AV's 200 path, or pedestrians waiting to cross the road on which the AV 200 travels). The intention output 237 executed on the output devices 240 can comprise, for example, a set of visual indicators (e.g., flashing forward directional arrows on the AV's 200 side panels and/or halting indicators such as a flashing red palm on the front bumper) specifying that the AV 200 will take the right-of-way through the intersection.

Conversely, the traffic signal can change to yellow prior to the critical threshold (e.g., at 65 feet). In response to identifying the signal change, the intention signaling system 235 can generate an intention output 237 indicating that the AV 200 will stop at the intersection, thus providing proximate pedestrians, human drivers, and other entities with reassurance that the AV 200 has identified the signal change. As an example, the intention output 237 corresponding to the AV 200 identifying the signal change can include a yellow flashing light on the output devices 240 to mimic the traffic signal itself. Along these lines, the intention signaling system 235 can provide a dynamic intention output 237 mimicking the traffic signal starting from when the signal state is detected by the intention signaling system 235—the intention output 237 can change from green, to yellow, to red, in conjunction with the detected traffic signal.

As the AV 200 approaches the intersection or other area of interest, the intention signaling system 235 can monitor for external entities, and dynamically determine a right-of-way state for the AV 200, as described in detail below with respect to FIG. 3. Based on the right-of-way state of the AV 200 and the detected external entity, the intention signaling system 235 generate a corresponding intention output 237 or permissive output 233 to signal the AV's 200 objective in resolving the potential conflict. Thus, the intention signaling system 235 can preemptively resolve potential right-of-way issues before they occur.

In variations, the intention signaling system 235 can utilize default rules for various scenarios. In one aspect, the intention signaling system 235 can automatically generate a permissive output 237 indicating that the AV 200 will yield at a crosswalk if a human is present proximate to the crosswalk. Additionally or alternatively, the intention signaling system 235 can be coupled to the AV control system 220 to generate reactive intention outputs 237 when, for example, the AV control system 220 performs an emergency maneuver. Thus, the intention signaling system 235 can receive feedback 224 from the AV control system 220 indicating that the AV control system 220 is accelerating or maintaining speed through an intersection, changing lanes, stopping, yielding, turning, reversing, performing an emergency maneuver, and the like. The intention signaling system 235 can process the feedback 224 and generate an intention output 237 for each action performed by the AV control system 220 accordingly.

In certain examples, the intention signaling system 235 can utilize route data 232 of the AV 200 to determine an immediate action to be performed by the AV 200, such as whether the AV 200 will proceed straight through an intersection, perform a turn, or make a U-turn. Based on the route data 232, the intention signaling system 235 can generate an intention output 237 in conjunction with or in place of the normal directional signals of the AV 200. Additionally, the intention signaling system 235 can identify any proximate conflicting entities such as pedestrians or human-driven vehicles and provide an intention output 237 if the AV 200 has right-of-way or a permissive output 233 if the AV 200 is yielding.

Accordingly, the intention signaling system 235 can improve upon human interactions that express intent, such as hand waving, head-nods, acknowledgments, or other human signals that provide other humans with intention signals. Furthermore, the intention signaling system 235 can improve upon current signaling systems of road vehicles to provide added clarity to the intent of the AV 200. For example, the intention signaling system 235 can utilize the output devices 240 to signal typical driving maneuvers, such as lane changes on the freeway, braking, acceleration, energy harvesting, and the like. In some implementations, the intention signaling system 235 can initiate a sleep state when the AV 200 travels in uncrowded or rural environments, and can initiate an operational state when one or more external entities are detected by the data processing system 210. Further description of the intention signaling system 235 is provided below with respect to FIG. 3.

Figure 3:
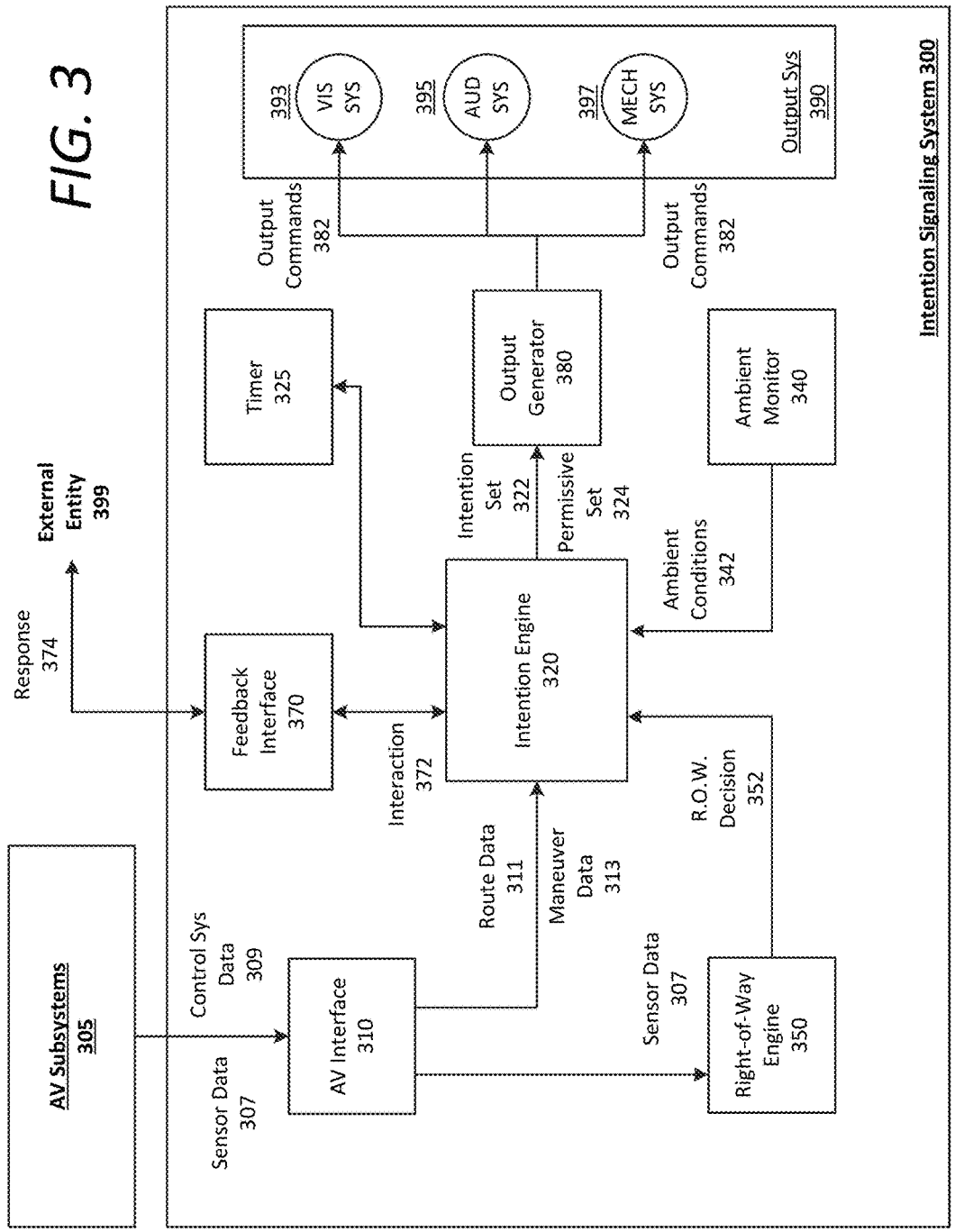
FIG. 3 is a block diagram illustrating an example intention signaling system as shown and described herein.

FIG. 3 is a block diagram illustrating an example intention signaling system as shown and described herein. The intention signaling system 300 can include an AV interface 310 to receive control system data 309 and sensor data 307 from the AV subsystems 305, such as the AV control system 220 or data processing system 210 described with respect to FIG. 2. In many aspects, the sensor data 307 can include image and/or LIDAR data of the AV's 200 situational environment. The AV interface 310 can forward the sensor data 307 to a right-of-way engine 350 which can determine a right-of-way decision 352 between the AV 200 and a particular external entity identified in the sensor data 307. Additionally, the control system data 309 can include route data 311 corresponding to a current route being driven by the AV control system, and maneuver data 313 indicating individual maneuvers to be performed by the AV (e.g., lane changes, turns, braking, emergency maneuvers, acceleration, etc.). The AV interface 310 can forward the route data 311 and the maneuver data 313 to an intention engine 320 of the intention signaling system 300, which can utilize the control system data 309 and the right-of-way decision 352 to determine whether to generate an output via an output system 390. For example, the intention engine 320 can determine whether to generate an intention output set 322 when the AV has right-of-way, or a permissive output set 324 when the external entity has right-of-way.

The right-of-way engine 350 can analyze the sensor data 307 for potential conflicts by external entities. A conflict may be a simple right-of-way resolution which would typically be resolved with a hand gesture or similar expression by humans. Additionally, a conflict may be an incident involving a collision with an external entity, such as a pedestrian, a human-driven vehicle, a bicyclist, etc. The right-of-way engine 350 can identify any entities in the sensor data 307 that may potentially cause a conflict, and determine, for each identified entity, whether the AV has right-of-way.

In certain aspects, the right-of-way engine 350 can analyze the sensor data 307 to identify right-of-way features, such as crosswalk indicators or signs, traffic signal states, road signs such as "stop" or "yield" signs, sub-signs such as "four-way" or "two-way" indicators on "stop" signs, and the like. In certain aspects, the right-of-way engine 350 can utilize such right-of-way indicators to determine, for each external entity identified in the sensor data 307 that may result in a potential conflict, whether or not the AV has right-of-way. For example, when the AV approaches a four-way stop sign, the right-of-way engine 350 can analyze the sensor data 307 to identify whether another vehicle approaches the four-way stop intersection prior to the AV. If so, the right-of-way engine 350 can generate a right-of-way decision 352 indicating that another vehicle has right-of-way, and transmit the right-of-way decision 352 to the intention engine 320. However, if another vehicle approaches the intersection after the AV, the right-of-way engine 350 can generate a right-of-way decision 352 indicating that the AV has right of way.

In many examples, the right-of-way engine 350 identifies areas of potential conflict, such as intersections, crosswalks, bicycle lanes, parking lots, high traffic areas, and the like. The right-of-way engine 350 can identify such areas in the sensor data 307 and/or by utilizing a sub-map, as described herein. The right-of-way engine 350 can further analyze the sensor data 307 for external entities, such as other vehicles, pedestrians, bicyclists, and the like. For each detected entity, or for common groups of entities (e.g., a group of pedestrians waiting to the street), the right-of-way engine 350 can analyze the sensor data 307 to determine whether a right-of-way indicator exists. If not, then the right-of-way engine 350 can implement default rules to make an ultimate right-of-way decision 352. For example, when identifying a pedestrian attempting to cross the road with or without a crosswalk, a default rule for the right-of-way engine 350 can be to generate a decision 352 indicating that the pedestrian has right-of-way. However, if the right-of-way engine 350 identifies a right-of-way indicator (e.g., a traffic signal), then the right-of-way engine 350 can generate the decision 352 based on the right-of-way indicator (e.g., green traffic light=AV's right-of-way).

For each external entity, the right-of-way engine 350 can transmit the decision 352 to the intention engine 320. The intention engine 320 can utilize the route data 311 and/or maneuver data 313 with the right-of-way decision 352 to generate an intention output set 322 or a permissive output set 324. In some examples, the intention engine 320 can further utilize ambient conditions 342 to determine the specified command to transmit to an output generator 380. In such examples, the intention signaling system 300 can include an ambient monitor 340 to detect the ambient conditions 342, such as lighting conditions (e.g., daytime or nighttime conditions) and ambient noise. The intention engine 320 can utilize the ambient conditions 342 to prioritize one or more output types in the output system 390. For example, in high noise conditions (e.g., when the AV is in motion), the intention engine 320 can generate an output set that does not include an output for the audio system 395. As another example, during nighttime conditions, the intention engine 320 can prioritize the visual system 393 (e.g., backlit displays) over mechanical systems 397 (e.g., a deployable mechanical hand).

The intention engine 320 can generate a particular output set for each decision 352 and for each detected external entity. The intention engine 320 can generate a permissive set 324 when the AV yields to the external entity, or an intention set 322 when the AV asserts its right-of-way to the external entity. For a given external entity (e.g., a pedestrian), the intention engine 320 can identify the right-of-way decision 352 indicating the right-of-way state for the AV. If the AV has right-of-way, the intention engine 320 can generate an intention set 322 providing the parameters of the potential conflict (e.g., a pedestrian in a forward direction of the AV where the AV has right-of-way). The intention engine 320 can transmit the intention set 322 to an output generator 380 which can generate and transmit output commands 382 to the output system 390 accordingly. As described herein, the output commands 382 can cause the visual 393, audio 395, and/or mechanical systems 397 to present the intention output to the external entity (e.g., flashing red palms on a display device indicating to the pedestrian to remain on the sidewalk).

However, if the AV does not have right-of-way, the intention engine 320 can generate a permissive output set 324 indicating that the AV will yield to the external entity. The intention engine 320 can transmit the permissive output set 324 to the output generator 380 indicating the parameters of the yield scenario (e.g., a pedestrian in a forward direction that has right-of-way). The output generator 380 can generate output commands 382 to be executed by the output system accordingly. For example, the output commands 382 can cause the audio system 385 to provide audio content indicating that the pedestrian can cross. At the same time, the output commands 382 can cause the visual system 393 to provide permissive visual content (e.g., green arrows for the pedestrian or a projected crosswalk on the road).

As described herein, in addition to functioning preventatively or as a preventative measure, the intention engine 320 can also function reactively or supportively based on maneuver data 313 from the control system. The maneuver data 313 can indicate maneuvers to be performed by the AV, such as lane changes or turns. The intention engine 320 can provide support to the AV control system by generating an intention output set 322 that can cause the output system 390 to present the AV's intent in performing the maneuver for all proximate entities. For example, when the AV control system wishes to cross a number of lanes in heavy traffic, the intention signaling system 300 can initially present indicators such as arrows indicating that the AV intends to change lanes. If the AV is unsuccessful, the intention signaling system 300 can increase a visual urgency in the intention output, such as changing the colors of the arrows, flashing the arrows at an increased frequency, or providing audio to the proximate entities. In certain aspects, the intention signaling system 300 can flash colored lights or symbols on the displays, and progressively increase the brightness or blink frequency, provide a visual countdown, and/or scroll across the display more rapidly to express urgency. As used herein, a "progressive" increase means beginning at a relatively low parameter and steadily increasing the parameter to express increasing urgency. In certain examples, the parameter may be audio volume, brightness, blink or flash rate, scroll rate, and the like.

In some examples, when the intention engine 320 generates an intention out set 322 or a permissive output set 324, the intention engine 320 can initiate a timer 325. Based on an amount of elapsed time, the intention engine 320 can increase a visual and/or urgency in the intention output set 322 or permissive output set 324. For permissive output sets 324 (e.g., in a crowded crosswalk scenario), the intention engine 320 can initially provide a calm acquiescence output, such as green displayed signals and/or a relaxed audio output (e.g., a calm voice informing external entities of the AV's acquiescence). As the timer 325 crosses a threshold, the intention engine can gradually increase the urgency of the permissive output 324 by, for example, changing the color of the displayed signals from green to yellow (i.e., to mimic a traffic light for the pedestrians), initiating a visual or audio countdown (e.g., mimicking a pedestrian signal), and/or provide and audio request for the AV to proceed across the crosswalk.

Urgency can further be indicated for intention output sets 322. For example, in heavy traffic, the AV may need to cross multiple lanes to reach a turn lane. In addition to normal directional signals, the intention signaling system 300 can output additional intention information on a number of visual features, such as a rear bumper display, a head-up display, or by deploying a mechanical indicator. The intention engine 320 can generate an initial indication, such as a green arrow set, which can flash or scroll across the displays of the visual system 393. As the need for the AV to cross lanes increases in urgency, the intention engine 320 can gradually increase the urgency of the intention output 322. Urgency parameters can include a flash or blink frequency, color changes, scroll speed (e.g., how fast a set of arrows scroll across the displays), expression changes by a displayed animated driver (e.g., showing more anxiety), or changes in audio (e.g., such as increasing the volume or tone, generating emergency audio signals, etc.).

In certain implementations, the intention signaling system 300 can include a feedback interface 370 through which the intention signaling system 300 can interact with a particular external entity 399. The feedback interface 370 can include one or more sensors to detect interactions from humans, such as physical gestures and speech. The sensors of the feedback interface can include any number of microphones, cameras, or touch sensors that can enable the external entity 399 to interact with the AV. Accordingly, the external entity 399 can provide an interaction 372 with the AV via the feedback interface 370. The interaction 372 can be a voice communication detected by a microphone of the intention signaling system 300, a physical gesture detected by a camera of the AV (e.g., a stereo camera of the sensor array), a touch input on a particular touch-sensitive panel accessible by the external entity 399 (e.g., indicating the external entity's 399 presence), and the like. The intention engine 320 can process the interaction 372 and generate a response 374 via the feedback interface 370, and/or the output system 390.

In some examples, the intention engine 320 can execute speech recognition logic to identify the spoken words of the external entity 399, such as a pedestrian's feedback regarding the AV's intention. Additionally or alternatively, the intention engine 320 can perform gesture detection to identify a physical interaction 372 by the external entity 399, such as a pedestrian performing a waving gesture indicating acquiescence to the AV. Thus, in response to the interaction 372, the intention engine 320 can generate a response 374, such as an acknowledgment of the interaction 372 using the feedback interface 370 or using the output system 390 (e.g., via an audio speaker or display). Example responses 374 can include an audible and/or visual "thank you" response, an acknowledgment of the interaction 372, or more complex responses that anthropomorphizes the AV to the external entity 399, such as displaying an animated character (e.g., a computer generated human representative of the AV) on a display visible to the external entity 399. In the latter examples, the intention signaling system 300 can provide an interactive experience to the external entity 399 that enables the external entity 399 to query the AV, provide feedback regarding the AV's intention or acquiescence, and the like.

In some aspects, the intention signaling system 300 can generate an intention output set 322 and a permissive output set 324 at the same time. For example, the AV interface 310 can receive sensor data 307 indicating multiple external entities in proximity to the AV. The right-of-way engine 350 can determine that one of the external entities has right-of-way while the AV has right-of-way over another external entity. For example, the AV may arrive at a four-way stop sign before a second vehicle, but after a first vehicle. In such a scenario, the intention signaling system 300 may generate permissive output 324 to the first vehicle, and an intention output 322 to the second vehicle at the same time (e.g., on opposite sides of the AV). In other examples, the AV can generate a permissive output 324 to a pedestrian to cross in front of the AV while generating a preventative output on the rear output devices of the AV to warn other vehicles that a pedestrian is crossing.

According to an example, the intention signaling system 300 can generate concurrent permissive and intention outputs 324, 322 when the external entities are on different sides of the AV (e.g., one entity in front and a second entity on a side of the AV), so as to prevent conflicting outputs. Thus, when detecting multiple entities, the intention signaling system 300 can determine whether the entities can view the same surfaces of the AV before outputting the permissive and intention outputs 324, 322 concurrently. If so, then the intention signaling system 300 can generate the intention and permissive outputs 322, 324 at the same time. If not, then the intention signaling system 300 can select a first external entity to first generate a permissive output 324, and subsequently generate an intention output 322 to take right-of-way accordingly. Such dual intention and permissive outputs 322, 324 can be generated for any combinations of entities, such as pedestrians, bicyclists, human-driven vehicles, and the like.

Figure 4A:
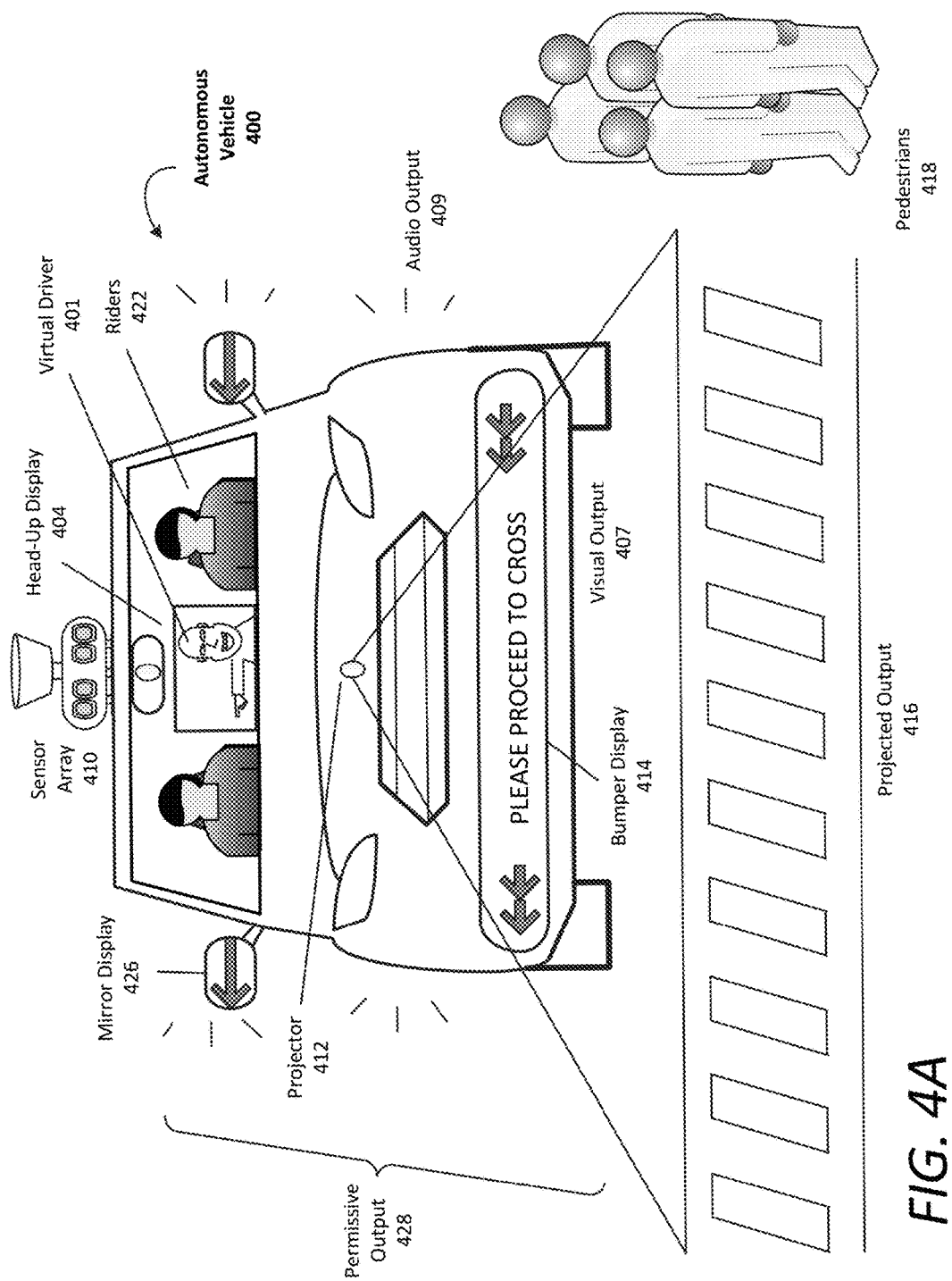
FIGS. 4A and 4B illustrate example implementations of an AV utilizing an intention signaling system, as described herein.
Figure 4B:
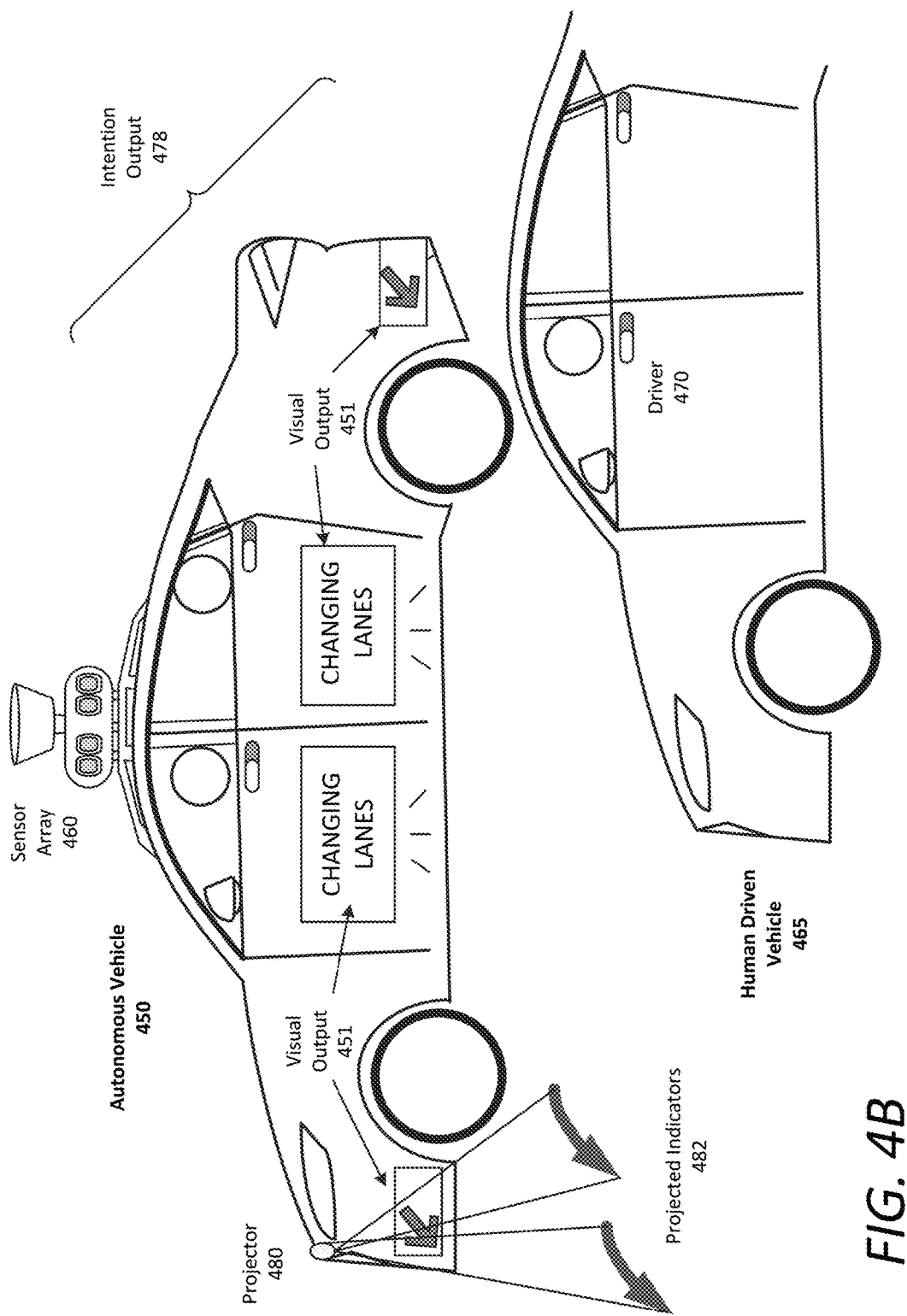

FIGS. 4A and 4B illustrate example implementations of an AV utilizing an intention signaling system for an autonomous vehicle, as described herein. In the below description of FIGS. 4A and 4B, reference may be made to like reference characters representing various features described with respect to FIGS. 2 and 3. Referring to FIG. 4A, as the AV 400 travels along a current route, the sensor array 410 can detect a group of pedestrians 418 on the side of the road. The intention signaling system 235 can process the situational data 217 from the sensor array 410 to identify the pedestrians 418. In further aspects, the intention signaling system 235 can further determine a direction one or more of the pedestrians 418 are facing to determine whether the pedestrians 418 show any signs or expression to cross the road on which the AV 400 travels. In response to identifying the pedestrians 418 and/or determining that the pedestrians 418 may wish to cross the road, the intention signaling system 235 can determine whether the AV 400 or the pedestrians 418 have right-of-way.

If the AV 400 has right-of-way, then the intention signaling system 235 can generate an intention output signaling to the pedestrians that the AV 400 intends to pass the pedestrians without yielding. The intention output can include, for example, one or more flashing red palms on a set of forward facing displays of the AV 400 (e.g., a bumper display 414, mirror displays 426, or a head-up display 404 visible through the windshield). In many aspects described herein, the intention output can be generated and displayed once the intention signaling system 235 identifies the pedestrians and determines right-of-way (e.g., 100 feet prior). The intention signaling system 235 can display the intention output until the AV 400 has passed the pedestrians 418 and then terminate the intention output thereafter. In some aspects, the intention signaling system 235 can generate a courtesy output, or "thank-you" output, on rearward facing displays once the AV 400 has passed the pedestrians. Additionally or alternatively, the intention signaling system 235 can provide an audible courtesy output, or "thank-you" output, as the AV 400 passes the pedestrians 418.

In certain regions or in the future, pedestrians 418 may always have right-of-way on certain streets (e.g., single lane roads) despite the lack of a designated crosswalk. Alternatively, the AV 400 may implement default rules to proceed with extreme caution when pedestrians 418 are identified proximate to the road. Accordingly, in certain aspects, the control system 220 of the AV 400 may always give right-of-way to pedestrians 418 on certain streets or in certain scenarios. As the pedestrians 418 are detected (e.g., 100 feet out), the intention signaling system 235 can automatically generate a permissive output AV 400 indicating to the pedestrians 418 that the AV 400 will yield. In such scenarios, the AV 400 can allow the pedestrians 418 to cross the road without hesitancy well before the AV 400 reaches the pedestrians 418, increasing traffic flow efficiency and giving the pedestrians 418 confidence and equanimity that the AV 400 has identified them and will not cause harm. Thus, in some examples, the pedestrians 418 may cross the road in front of the AV 400 with confidence, and without the AV 400 stopping or even reducing speed.

The output devices 240 of the intention signaling system 235 can include any number of visual or audio devices. In the example shown in FIG. 4A, the AV 400 includes a head-up display device 404. The head-up display device 404 can include a display device mounted to the ceiling of the passenger interior, and can include a translucent reflector that can reflect content from the display device so as to be viewable from the exterior of the AV 400. The translucency of the reflector can minimize any hindrances to the view of the riders 422. The output devices 240 can further include a number of displays integrated with the bodywork of the AV 400, such as one or more bumper displays 414, or mirror displays 426 on the forward facing sides of the side-view mirrors. The output devices 240 can further include a smart display, or augmented reality display integrated with the windshield or other windows of the AV 400. The output devices 240 can further include an audio system to provide an audio output 409 asserting the intent of the AV 400. The output devices 240 can further include a projector system 412, to provide a projected output 416 reflecting the intent of the AV 400. Various other output devices 240 are contemplated, such as mechanical devices, such as mechanical hands or other indicators that can be deployed within the interior or on the exterior of the AV 400 (e.g., mechanical arrows or hands deployed from the bodywork). Additionally, the output devices 240 can include other displays or colored LEDS (e.g., green, yellow, and red LEDS) on the bodywork, or within the headlamp covers of the AV 400.

In the example shown in FIG. 4A, the intention signaling system 235 can generate a permissive output 428 when the pedestrians 418 are detected. The permissive output 428 can include an audio output 408 indicating that the pedestrians 418 can cross the road in front of the AV 400. In some examples (e.g., in nighttime conditions), the intention signaling system 235 can utilize the projector 412 to provide a projected output 416 (e.g., a projected crosswalk) further indicating that the AV 400 is permitting the pedestrians 418 to cross. The permissive output can further include a visual output 407 on the display devices (e.g., the bumper display 414 and the mirror displays 426). The visual output 407 can include a text-based output, such as "Please proceed to cross," as shown in FIG. 4A. The visual output 407 can further include a set of symbols or other indicators (e.g., arrows), which can flash or scroll across the display devices 414, 426. The symbols can be color-coded (e.g., green arrows) indicating to the pedestrians that they may proceed accordingly. In one example, the audio output 409 mimics the text-based visual output 407.

In variations, the intention signaling system 235 generates a virtual driver or character 401 that can mimic typical human behaviors without rider 422 involvement. The virtual driver 401 can be presented on the display devices on the exterior of the AV 400, or via windshield displays or the head-up display 404. The virtual driver 401 can perform facial expressions and combinations of human signaling, such as making eye-contact with the pedestrians 418 and providing hand signals or waving gestures. Once, the pedestrians 418 are safely across the street, the intention signaling system 235 can terminate the permissive output 428 and or generate a courtesy output accordingly.

Referring to FIG. 4B, the AV 450 can travel along a current route and can require a turn action or lane change. The AV 450 can be in motion or at rest at an intersection. An external entity can be detected by the intention signaling system 235 which can either provide a permissive output yielding to the external entity or an intention output asserting right-of-way over the external entity. In the example shown in FIG. 4B, the external entity is a human-driver 470 of a human-driven vehicle 465. Utilizing route data from the control system 220 and situational data 217 from the sensor array 460, the intention signaling system 235 can identify the human-driven vehicle 465, and attempt to change lanes. If the lane change is urgent (e.g., for an upcoming traffic intersection or freeway exit), the intention signaling system 235 can generate the intention output 478 to express the urgency. In certain aspects, the intention signaling system 235 can generate a visual output 451 to include text-based intent or symbols such as arrows indicating the direction in which the AV 450 must drive. In some examples, the intention signaling system 235 can utilize the projector 480 to project indicators 482 on the road to indicate to the driver 470 that the AV 450 wishes to change lanes.

As urgency increases, the intention signaling system 235 can increase certain urgency parameters of the intention output 478. In certain examples, the intention signaling system 235 can increase the brightness or change the colors of the visual output and/or the projected indicators 482. Additionally or alternatively, the intention signaling system 235 can generate an audio output to provide the driver 470 with adequate indication of the AV's 450 intent. If the driver 470 ignores the intention output 478, then the control system 220 can slow the AV 450 and merge behind the human-driven vehicle 465. However, in certain examples, if the driver 470 complies with the intention output 478, then the intention signaling system 235 can generate a courtesy output accordingly to thank the driver 470 for complying.

Methodology

Figure 5A:
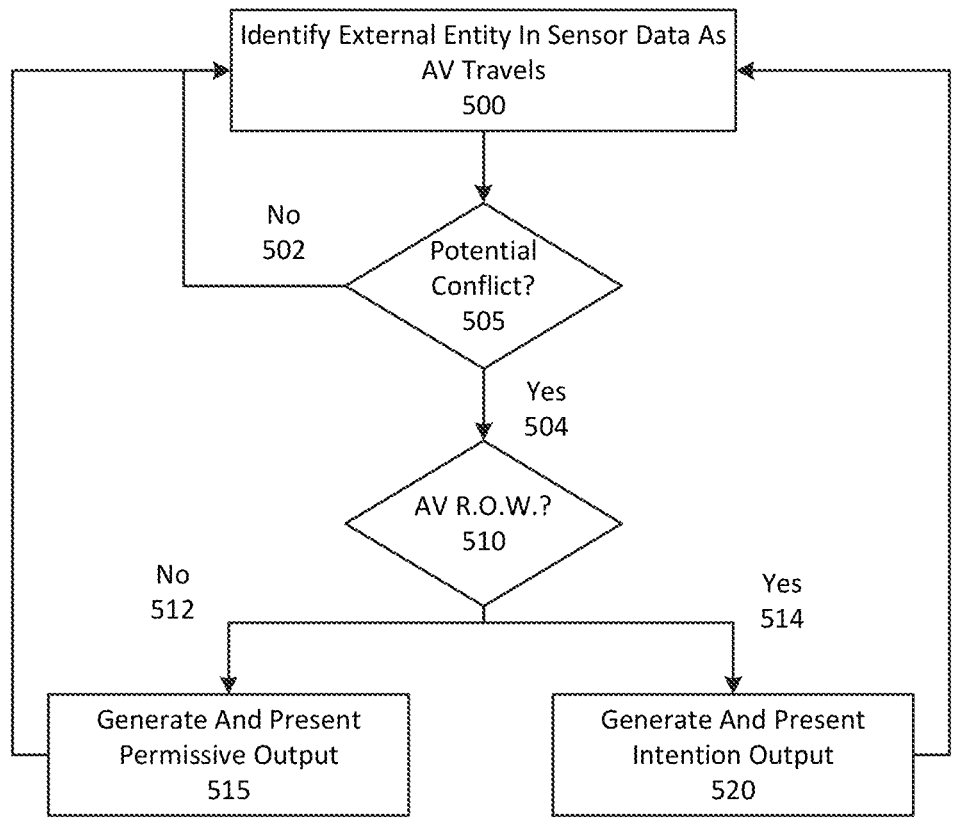
FIGS. 5A and 5B are flow charts describing example methods of operating an intention signaling system in accordance with example implementations.
Figure 5B:
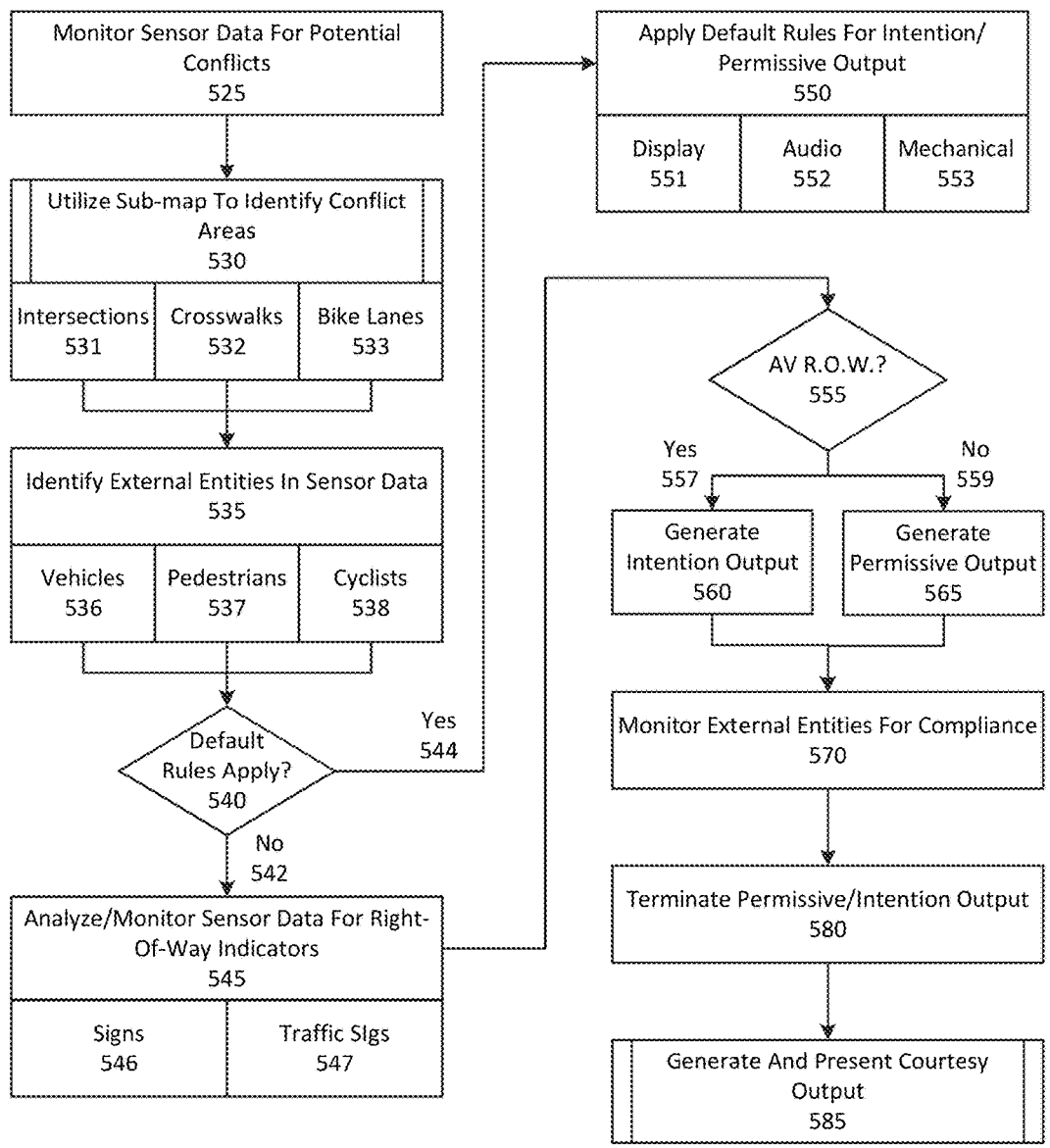

FIGS. 5A and 5B are flow charts describing example methods of operating an intention signaling system in accordance with example implementations. In the below descriptions of FIGS. 5A and 5B, reference may be made to like reference characters representing various features shown and described with respect to FIGS. 1 through 3. Furthermore, the methods described in connection with FIGS. 5A and 5B may be performed by example intention signaling systems 235, 300 shown and described with respect to FIGS. 2 and 3. Referring to FIG. 5A, the intention signaling system 235 can identify an external entity in sensor data as the AV 200 travels along a current route (500). In many examples, the intention signaling system 235 can determine whether a potential conflict may occur between the AV and the external entity (505). As described, the external entity may be a human-based entity, such as a pedestrian, a bicyclist, a human-driven vehicle, and the like. The potential conflict may be anything from a simple right-of-way decision at a four-way stop, to a potential collision or other accident.

If the intention signaling system 235 determines that there is no potential conflict (502), then the intention signaling system 235 can continue monitoring the sensor data to identify external entities (500). In determining that there is no potential for conflict, the intention signaling system 235 can receive input from the AV control system 220 and/or data processing system 210 which can execute prediction logic to determine a path or intent of the external entity. For example, the intention signaling system 235 can determine that a pedestrian is facing a direction opposite to the street, or that a proximate vehicle is driving away from an approaching intersection.

If the intention signaling system 235 determine that a potential conflict exists with the external entity (504), then the intention signaling system 235 can determine whether the AV 200 has right-of-way with respect to the external entity (510). In some examples, the intention signaling system 235 can analyze the sensor data for right-of-way indicators, such as traffic signals, road signs, bicycle lanes, crosswalks, and the like. If a right-of-way indicator is identified, then the intention signaling system 235 can determine whether the indicator indicates right-of-way for the AV 200 or the external entity (510). For example, a crosswalk or crosswalk sign can indicate that a pedestrian has right-of-way. As another example, a traffic signal indicates right-of-way for an external entity waiting at an intersection. In one example, the AV 200 can approach a four-way stop intersection. The intention signaling system 235 can determine right-of-way by monitoring whether the AV 200 or the external entity approaches the intersection first.

If the intention signaling system 235 determines that the external entity has right-of-way (512), the intention signaling system 235 can generate and present a permissive output indicating that the AV 200 will yield to the external entity (515). However, if the intention signaling system 235 determines that the AV 200 has right-of-way, then the intention signaling system 235 can generate and present an intention output asserting that the AV 200 will proceed with right-of-way (520). The permissive and intention output can include, for example, displayed animations (e.g., on external or internal displays), color coded symbols or arrows, scrolling and/or flashing symbols or arrows, audio, projected images, mechanically deployed indicators, and the like. Once the potential conflict is resolved or has passed, the intention signaling system 235 can terminate the output and continue monitoring the sensor data for external entities (500).

Referring to FIG. 5B, the intention signaling system 235 of the AV 200 can continuously monitor sensor data (e.g., situational data 217) for potential conflicts (525). In some examples, the intention signaling system 235 monitors a 360° view field surrounding the AV 200 to identify external entities (e.g., other vehicles) that may interact with the AV 200. In certain implementations, the intention signaling system 235 can provide feedback to proximate vehicles, indicating that the AV 200 is aware of the position of the respective proximate vehicle, prior to initiating an intention maneuver. In variations, the intention signaling system 235 can analyze a current sub-map 238 to identify potential conflict areas along the current route of the AV 200 (530). As described herein, the sub-maps 231 of a given region can comprise previously recorded and/or compiled information of a given regions. The current sub-map 238 can include information corresponding to a sub-map area through which the AV 200 current travels. The information can include LIDAR data, image data, schematic data, right-of-way data, and/or information relating to the locations and characteristics of intersections (e.g., traffic signaling systems or types of stop signs for intersections (531), crosswalks (532), bicycle lanes (533), and the like).

Analyzing the sensor data, the intention signaling system 235 can identify external entities that can result in potential conflict (535). In some examples, the intention signaling system 235 can cross correlate or perform a matching operation between potential areas of conflict in the current sub-map 238 and the detected entities in the sensor data and mark or otherwise designate target entities most likely to cause conflict. For example, the intention signaling system 235 can focus on external entities that are located within identified areas of conflict, such as near crosswalks or intersections, or entities with a heading towards an area of conflict, such as a vehicle traveling towards an upcoming intersection. External entities can include any human-based entity, such as a human-driven vehicle (536), a bicyclist (538), a skateboarder or in-line skater, a jogger, pedestrians (537), and the like.

In some examples, the intention signaling system 235 can determine whether default rules apply to a particular external entity (540). Default rules make be linked to local laws or ordinances of the given region. Example default rules can include universal right-of-way rules for pedestrians, right-of-way exceptions for bicyclists or motorcycles, right-of-way rules for all-way stops (e.g., right vehicle gets right-of-way in a tie), the lack of road signs (e.g., "common sense" rules), etc. If default rule apply (544), then the intention signaling system 235 can apply the default rules in generating the intention or permissive output (550). As described herein, such outputs can include visual outputs on one or more displays visible from the exterior of the AV 200 (e.g. a head-up display or display devices mounted on the bodywork) (551). Additionally or alternatively, the output can include audio, such as a jingle, a siren, or voice (552). In further variations, the output can include a deployable mechanical device, such as a mechanical arm or hand to wave to the external entity in a human-like manner (553).

However, if default rules do not apply (542), then the intention signaling system 235 can analyze or monitor the sensor data for right-of-way indicators, as discussed herein (545). Such indicators can include road signs (546), traffic signals (547), or other indications. Accordingly, the intention signaling system 235 can determine whether the AV 200 has right-of-way with respect to the external entity (555). If the AV 200 has right-of-way (557), then the intention signaling system 235 can generate an intention output indicating to the external entity that the AV 200 is asserting its right-of-way (560). If the AV 200 does not have right-of-way (559), then the intention signaling system 235 can generate a permissive output indicating that the AV 200 will yield to the external entity (565).

Once the output is presented to the external entity, the intention signaling system 235 can monitor the external entity for compliance (570). For example, as the AV 200 approaches a crosswalk and outputs a permissive signal set for pedestrians to cross, the intention signaling system 235 can monitor the pedestrians as they cross the road. Once the external entities have complied with the permissive or intention output, the intention signaling system 235 can terminate the output (580). Optionally, the intention signaling system 235 can generate and present a courtesy output to the external entity thereafter (585).

One or more steps of the foregoing description with respect to FIGS. 5A and 5B may be omitted as contemplated. For example, the intention signaling system 235 need not determine right-of-way information or even detect external entities when asserting intent in certain scenarios (e.g., when changing lanes or passing through an intersection). As such, the intention signaling system 235 can provide an output by default whenever performing such actions as turning at an intersection, stopping at a red light (e.g., projecting a crosswalk in spite of there being no detected pedestrians), or making an announcement when going around a blind corner. Furthermore, the intention signaling system 235 can further be utilized by the AV control system 220 as a support system for the directional lights, brake lights, and headlights. Thus, in addition to providing proactive resolution and/or feedback to external entities for potential conflicts, the intention signaling system 235 can behave reactively to current indicators of typical vehicles.

Hardware Diagram

Figure 6:
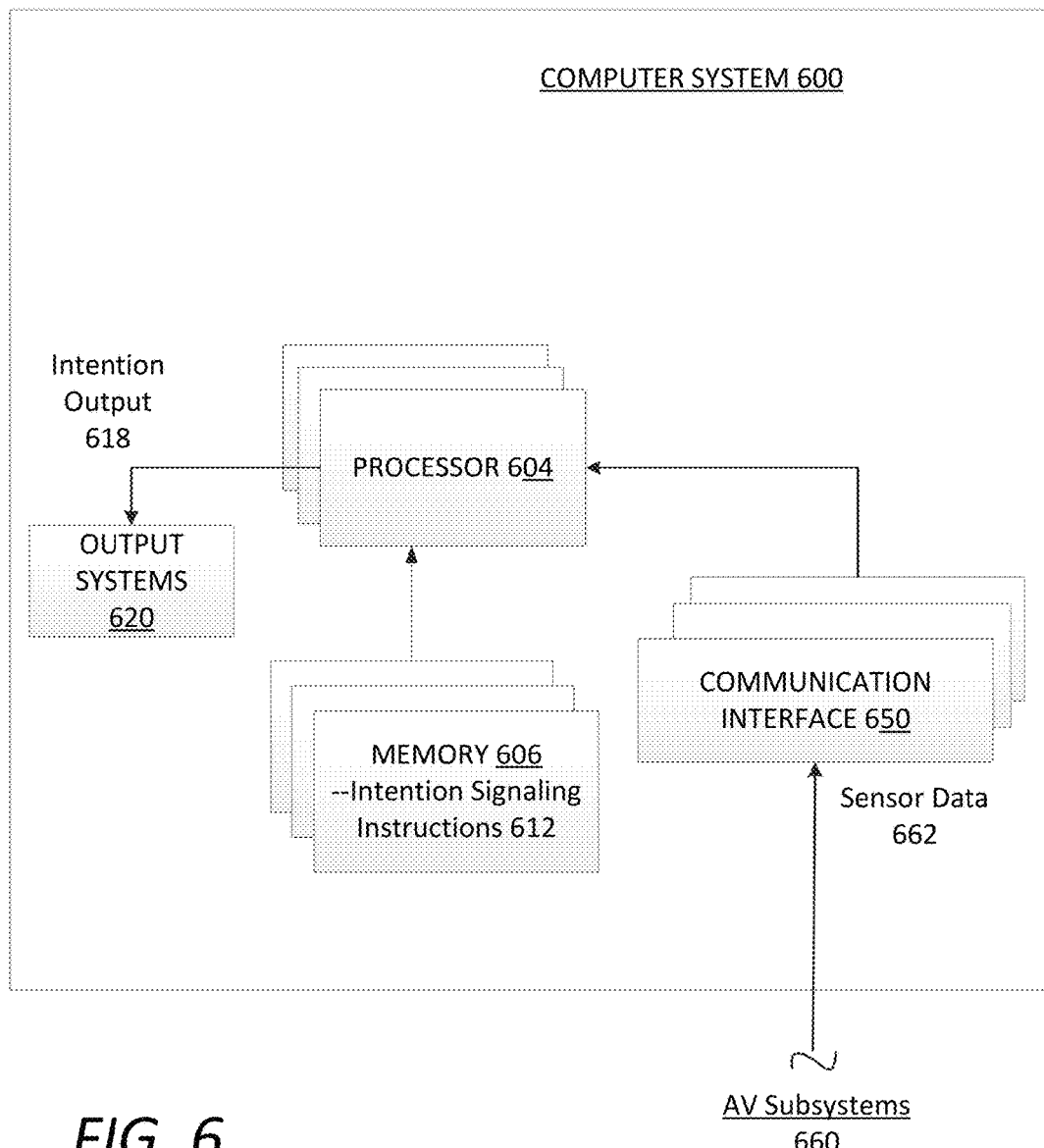
FIG. 6 is a block diagram illustrating a computer system upon which examples described herein may be implemented.

FIG. 6 is a block diagram illustrating a computer system upon which examples described herein may be implemented. For example, the intention signaling system 235 shown and described with respect to FIGS. 2 and 3 may be implemented on the computer system 600 of FIG. 6. The computer system 600 can be implemented using one or more processors 604, and one or more memory resources 606. In the context of FIG. 2, the intention signaling system 235 can be implemented using one or more components of the computer system 600 shown in FIG. 6.

According to some examples, the computer system 600 may be implemented within an autonomous vehicle with software and hardware resources such as described with examples of FIGS. 1 through 3. In an example shown, the computer system 600 can be distributed spatially into various regions of the autonomous vehicle, with various aspects integrated with other components of the autonomous vehicle itself. For example, the processors 604 and/or memory resources 606 can be provided in the trunk of the autonomous vehicle. The various processing resources 604 of the computer system 600 can also execute intention signaling instructions 612 using microprocessors or integrated circuits. In some examples, the intention signaling instructions 612 can be executed by the processing resources 604 or using field-programmable gate arrays (FPGAs).

In an example of FIG. 6, the computer system 600 can include a local communication interface 650 (or series of local links) to vehicle interfaces and other resources of the autonomous vehicle (e.g., the computer stack drives). In one implementation, the communication interface 650 provides a data bus or other local links to electro-mechanical interfaces of the vehicle, such as wireless or wired links to the AV control system 220.

The memory resources 606 can include, for example, main memory, a read-only memory (ROM), storage device, and cache resources. The main memory of memory resources 606 can include random access memory (RAM) or other dynamic storage device, for storing information and instructions which are executable by the processors 604. The processors 604 can execute instructions for processing information stored with the main memory of the memory resources 606. The main memory 606 can also store temporary variables or other intermediate information which can be used during execution of instructions by one or more of the processors 604. The memory resources 606 can also include ROM or other static storage device for storing static information and instructions for one or more of the processors 604. The memory resources 606 can also include other forms of memory devices and components, such as a magnetic disk or optical disk, for purpose of storing information and instructions for use by one or more of the processors 604.

According to some examples, the memory 606 may store a plurality of software instructions including, for example, intention signaling instructions 612. The intention signaling instructions 612 may be executed by one or more of the processors 604 in order to implement functionality such as described with respect to the intention signaling system 235, 300 of FIGS. 2 and 3.

In certain examples, the computer system 600 can receive sensor data 662 over the communication interface 650 from various AV subsystems 660 (e.g., the AV control system 220 or an on-board computer 210 respectively). In executing the intention signaling instructions 612, the processing resources 604 can monitor the sensor data 662 and generate intention outputs 618 (or permissive outputs) to the output systems 620 of the AV 200 in accordance with examples described herein.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. An intention signaling system for an autonomous vehicle (AV) comprising:
   an output system;
   one or more processors; and
   one or more memory resources storing instructions that, when executed by the one or more processors, cause the intention signaling system to:
   monitor sensor information indicating a situational environment of the AV;
   as the AV approaches an intersection, detect an external entity based, at least in part, on the sensor information;
   based on detecting the external entity, determine a right-of-way for the intersection between the AV and the external entity;
   when the AV has the right-of-way, generate an intention output using the output system to signal an intent of the AV to proceed through the intersection;
   when the external entity has the right-of way:
   generate a permissive output using the output system to signal acquiescence to the external entity;
   monitor the external entity to determine when the external entity complies with the permissive output; and
   when the external entity has complied with the permissive output, terminate the permissive output and generate a designated intention output to signal that the AV is to proceed through the intersection;

wherein the executed instructions cause the intention signaling system to generate the permissive output by progressively increasing urgency parameters of the permissive output until the external entity has complied with the permissive output, and wherein the urgency parameters comprise at least one of an audio volume, a brightness, a flash rate, or a scroll rate of the permissive output.

2. The intention signaling system of claim 1, wherein the executed instructions further cause the intention signaling system to:

while proceeding through the intersection, terminate the designated intention output, and generate a courtesy output.

3. The intention signaling system of claim 1, wherein the output system comprises a set of display devices on an exterior of the AV.

4. The intention signaling system of claim 3, wherein the set of display devices comprise at least one of a forward display device visible from a forward direction the AV, a plurality of side panel display devices visible from sides of the AV, and a rear display device visible from a rear of direction of the AV.

5. The intention signaling system of claim 1, wherein the output system comprises at least one projector device to project intention and permissive outputs onto a road surface proximate to the AV.

6. The intention signaling system of claim 1, wherein the output system comprises one or more head-up display devices mounted within a passenger interior of the AV, wherein each of the one or more head-up display devices comprises a display screen to generate intention and permissive outputs, and a translucent mirror to reflect the intention and permissive outputs to be viewable from an exterior of the AV.

7. The intention signaling system of claim 6, wherein the display screen of each of the one or more head-up display devices is mounted on a ceiling of the passenger interior.

8. The intention signaling system of claim 1, wherein the output system comprises a mechanical indicator that signals the intent or the acquiescence of the AV.

9. The intention signaling system of claim 1, wherein the output system comprises an audio system that signals the intent or the acquiescence of the AV.

10. The intention signaling system of claim 1, wherein the external entity comprises at least one of a human driven vehicle, a pedestrian, or a bicyclist.

11. An autonomous vehicle (AV) comprising:
a sensor system to generate sensor data corresponding to a situational environment of the AV;
a data processing system to process the sensor data to dynamically identify potential hazards as the AV travels along a current route;
an acceleration, steering, and braking system;
a control system to utilize the processed sensor data to autonomously control the acceleration, steering, and braking system along the current route; and
an intention signaling system comprising:
an output system;
one or more processors; and
one or more memory resources storing instructions that, when executed by the one or more processors, cause the intention signaling system to:
monitor the sensor data;
as the AV approaches an intersection, detect an external entity based, at least in part, on the sensor data;
based on detecting the external entity, determine a right-of-way for the intersection between the AV and the external entity;
when the AV has the right-of-way, generate an intention output using the output system to signal an intent of the AV to proceed through the intersection;
when the external entity has the right-of way:
generate a permissive output using the output system to signal acquiescence to the external entity;
monitor the external entity to determine when the external entity complies with the permissive output; and
when the external entity has complied with the permissive output, terminate the permissive output and generate a designated intention output to signal that the AV is to proceed through the intersection;
wherein the executed instructions cause the intention signaling system to generate the permissive output by progressively increasing urgency parameters of the permissive output until the external entity has complied with the permissive output.

12. The AV of claim 11, wherein the executed instructions further cause the intention signaling system to:
while proceeding through the intersection, terminate the designated intention output, and generate a courtesy output.

13. A non-transitory computer-readable medium storing intention signaling instructions for an autonomous vehicle (AV), wherein the instructions, when executed by one or more processors, cause the one or more processors to:
monitor sensor information indicating a situational environment of the AV;
as the AV approaches an intersection, detect an external entity based, at least in part, on the sensor information;
based on detecting the external entity, determine a right-of-way for the intersection between the AV and the external entity;
when the AV has the right-of-way, generate an intention output using an output system of the AV to signal an intent of the AV to proceed through the intersection;
when the external entity has the right-of way:
generate a permissive output using the output system to signal acquiescence to the external entity;
monitor the external entity to determine when the external entity complies with the permissive output; and
when the external entity has complied with the permissive output, terminate the permissive output and generate a designated intention output to signal that the AV is to proceed through the intersection;
wherein the executed instructions cause the one or more processors to generate the permissive output by progressively increasing urgency parameters of the permissive output until the external entity has complied with the permissive output.

14. The non-transitory computer-readable medium of claim 13, wherein the executed instructions further cause the one or more processors to:

while proceeding through the intersection, terminate the designated intention output, and generate a courtesy output.

* * * * *